(12) United States Patent
Chang et al.

(10) Patent No.: US 9,501,207 B2
(45) Date of Patent: *Nov. 22, 2016

(54) PROVIDING CONTEXT-AWARE INPUT DATA

(75) Inventors: Xu Chang, Beijing (CN); Wen Xin Cheng, Beijing (CN); Dikran S. Meliksetian, Danbury, CT (US); Zhi Jun Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1194 days.

This patent is subject to a terminal disclaimer.

(21) Appl. No.: 13/434,234

(22) Filed: Mar. 29, 2012

(65) Prior Publication Data

US 2012/0192097 A1 Jul. 26, 2012

Related U.S. Application Data

(63) Continuation of application No. 12/954,203, filed on Nov. 24, 2010, now Pat. No. 9,104,439.

(30) Foreign Application Priority Data

Nov. 27, 2009 (CN) .......................... 2009 1 0224872

(51) Int. Cl.
 *G06F 17/24* (2006.01)
 *G06F 3/0484* (2013.01)
 *G06F 9/44* (2006.01)
(52) U.S. Cl.
 CPC ........... *G06F 3/0484* (2013.01); *G06F 9/4443* (2013.01); *G06F 17/243* (2013.01)

(58) Field of Classification Search
 CPC ..................................................... G06F 17/243
 See application file for complete search history.

(56) References Cited

U.S. PATENT DOCUMENTS

| 7,028,288 | B2 | 4/2006 | Wall et al. |
| 7,216,292 | B1 | 5/2007 | Snapper et al. |
| 7,660,779 | B2 | 2/2010 | Goodman et al. |
| 8,826,115 | B2 | 9/2014 | Raje |
| 2003/0078949 | A1 | 4/2003 | Scholz et al. |
| 2003/0226115 | A1 | 12/2003 | Wall et al. |
| 2007/0277099 | A1 | 11/2007 | Nakayama et al. |

FOREIGN PATENT DOCUMENTS

| CN | 1555523 A | 12/2004 |
| CN | 1696937 A | 11/2005 |
| CN | 1763742 A | 4/2006 |

(Continued)

OTHER PUBLICATIONS

Author Unknown, Examiner, State Intellectual Property Office of the People's Republic of China, Office Action for Chinese Application No. 200910224872.5 (English translation not available), Mar. 22, 2013, pp. 1-8, Beijing, PRC.

(Continued)

*Primary Examiner* — Alvin Tan
(74) *Attorney, Agent, or Firm* — Lee Law, PLLC; Christopher B. Lee

(57) ABSTRACT

External constraints with respect to at least one input field of at least one application are generated. Context-aware input data is provided to at least one input field of a currently used application, based on the external constraints.

10 Claims, 7 Drawing Sheets

(56) References Cited

FOREIGN PATENT DOCUMENTS

| CN | 101196885 A | 6/2008 |
| CN | 101346718 A | 1/2009 |
| JP | 01-320634 A | 8/1991 |
| JP | 10-277617 A | 6/1999 |
| JP | 11-025191 A | 8/2000 |
| JP | 12-233169 A | 2/2002 |
| JP | 12-365972 A | 6/2002 |
| JP | 18-143134 A | 12/2007 |
| JP | 19-061171 A | 9/2008 |

OTHER PUBLICATIONS

United States Patent and Trademark Office, Office Action for U.S. Appl. No. 12/954,203, May 1, 2013, pp. 1-21, Alexandria, VA, USA.

Author Unknown, Examiner, State Intellectual Property Office of the People's Republic of China, Office Action for Chinese Application No. 200910224872.5 (English translation not available), Nov. 20, 2013, pp. 1-8, P. R. China.

United States Patent and Trademark Office, Office Action for U.S. Appl. No. 12/954,203, Oct. 3, 2014, pp. 1-20, Alexandria, VA, USA.

Takeshi Chusho, et al., Automatic Filling in a Form by an Agent for Web Applications, Proceedings of the Ninth Asia-Pacific Software Engineering Conference, 2002, pp. 1-10, IEEE Computer Society, Washington, DC, USA.

United States Patent and Trademark Office, Notice of Allowance for U.S. Appl. No. 12/954,203, Mar. 30, 2015, pp. 1-15, Alexandria, VA, USA.

Alan Dix, Tasks = Data + Action + Context: Automated Task Assistance through Data-Oriented Analysis, Book Chapter: Engineering Interactive Systems 2008, 2008, pp. 1-13, vol. LNCS 5247, International Federation for Information Processing, Germany.

Alan Dix, et al., From Information to Interaction: in Pursuit of Task-centred Information Management, Conference Paper: Second Delos Conference on Digital Libraries 2007, Dec. 2007, pp. 1-15, Delos, Pisa, Italy.

Enrico Rukzio, et al., Automatic Form Filling on Mobile Devices, Journal: Pervasive and Mobile Computing, Published online Sep. 2007, pp. 1-21, Elsevier Ltd., Published on the World Wide Web.

United States Patent and Trademark Office, Office Action for U.S. Appl. No. 12/954,203, Dec. 11, 2012, pp. 1-14, Alexandria, VA, USA.

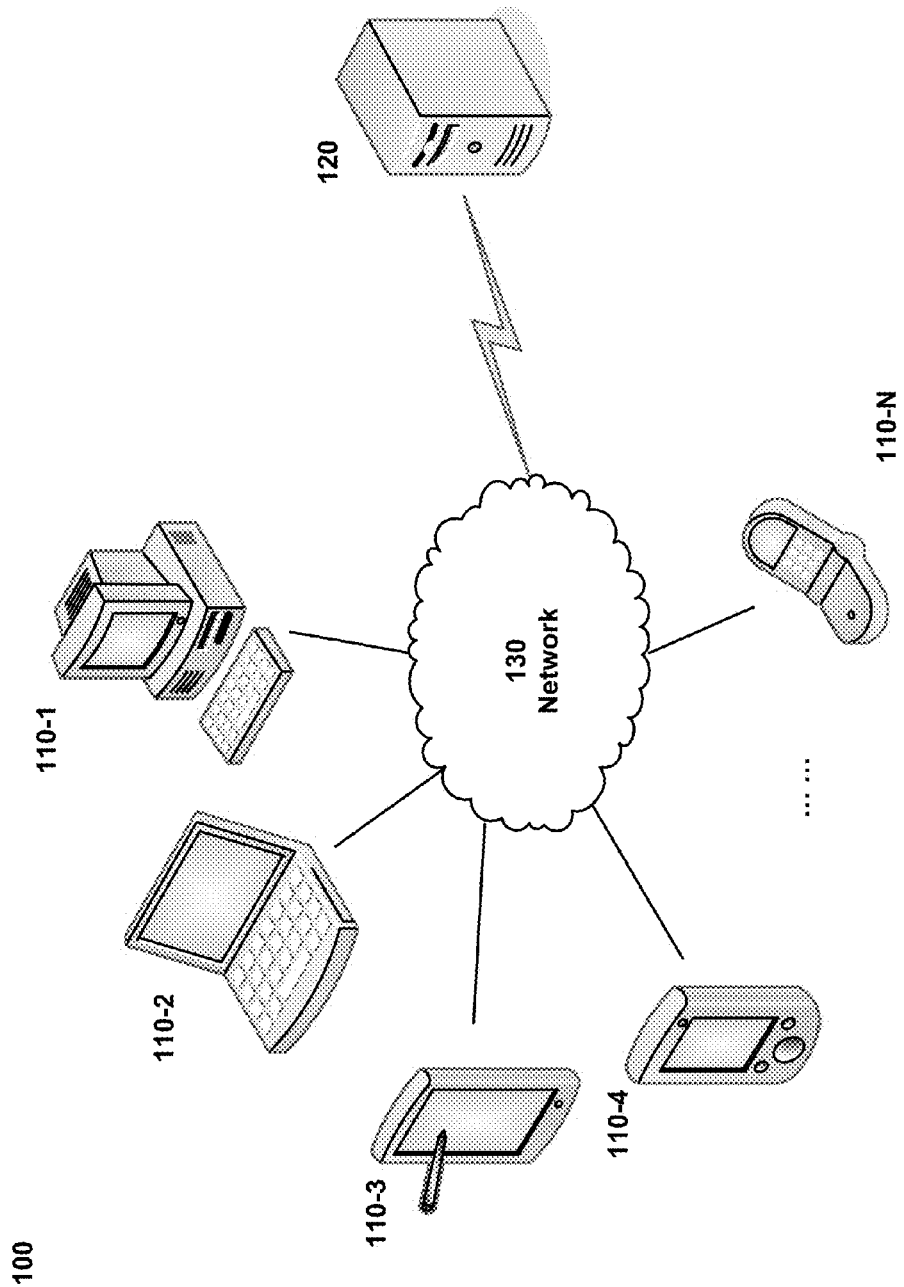

Vendor ID [Company|
1. CompanyA - 9878987
2. CompanyB - 1273645
3. CompanyC - 9309980

City: Beijing
Country: P. R. China
Tele: +86-010-
Zip code: 100000

Fig.4C

PO Number [9875673]
The PO number does not exist.

First application
410
Teddy
Hircock
teddy@xxx.com
1234567890
China
China, Beijing
412

Second application (prior to copy)
420
Last Name
Telephone
Address
422

Second application (subsequent to copy)
430
First Name: Teddy          Last Name: Hircock
Email Address: teddy@xxx.com   Telephone: 1234567890
Country: China             Address: China, Beijing
432

Fig.4

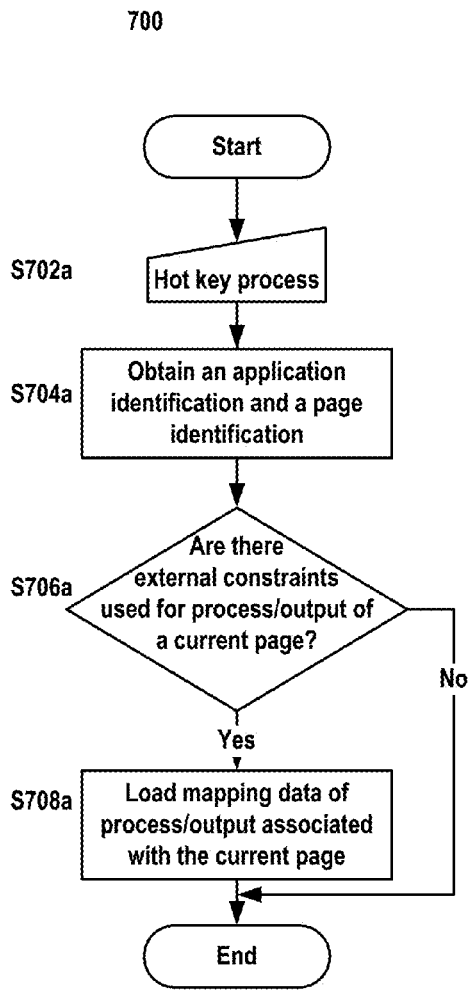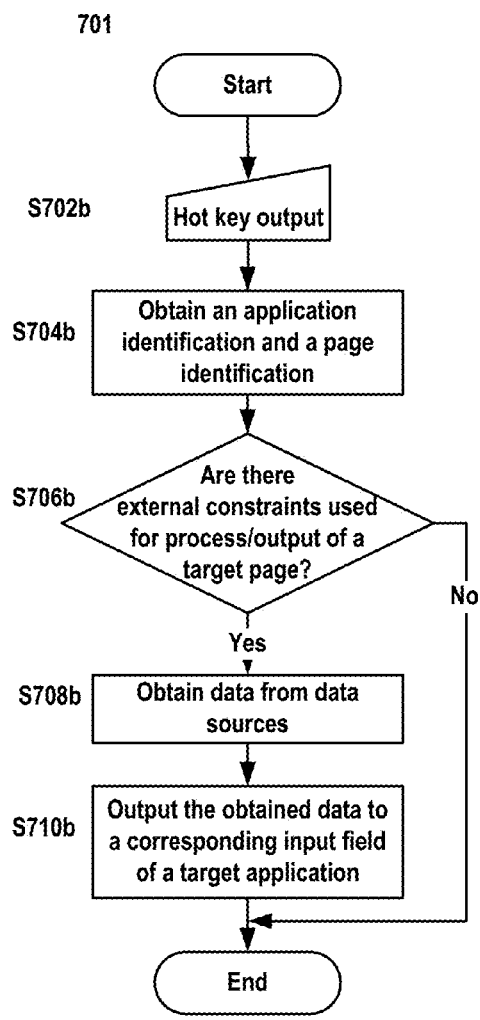
Fig.7A
Fig.7B
Fig.7

PROVIDING CONTEXT-AWARE INPUT DATA

RELATED APPLICATIONS

This application is a continuation of and claims priority to and claims the benefit of U.S. patent application Ser. No. 12/954,203 titled "METHOD AND APPARATUS FOR PROVIDING CONTEXT-AWARE INPUT DATA," which was filed in the United States Patent and Trademark Office on Nov. 24, 2010, and this application claims priority to and claims the benefit of Chinese Patent Application Serial No. 200910224872.5, which was filed in the State Intellectual Property Office of the People's Republic of China on Nov. 27, 2009, both of which are incorporated herein by reference in their entirety.

BACKGROUND

The embodiments of the present invention relate to the field of data processing and, more specifically, to a method and apparatus for providing context-aware input data to an application running on a computer system.

With rapid development of computer technology, various types of applications permeate human work, life, and many other aspects. In either routine duties or daily life, people need to face various applications and enter inputs to input fields of applications through computer peripherals, such as a keyboard and a mouse.

BRIEF SUMMARY

The present subject matter provides a method and apparatus for providing input data to an application running on a computer system, such that the method and apparatus may provide context-aware input data for a specific input field, verify the validity of input data while improving the input efficiency, and further provide more complex constraints among respective input fields.

In an embodiment of the present subject matter, there is provided a method for providing context-aware input data to an application running on a computer system. The method comprises: generating in advance external constraints with respect to at least one input field of at least one application; and providing context-aware input data to at least one input field of a currently used application, based on the external constraints.

In another embodiment of the present subject matter, generating in advance the external constraints comprises at least one of: generating in advance a first external constraint with respect to input data of a single input field of the at least one application; and generating in advance a second external constraint with respect to an association relationship between input data of at least two input fields of the at least one application.

In an embodiment of the present subject matter, there is provided an apparatus for providing context-aware input data to an application running on a computer system. The apparatus comprises: a memory; and a processor programmed to execute: a generation component for generating in advance external constraints with respect to at least one input field of at least one application within the memory; and a provision component for providing context-aware input data to at least one input field of a currently used application, based on the external constraints.

In another embodiment of the present subject matter, the generation component comprises at least one of: a first generation component for generating in advance a first external constraint with respect to input data of a single input field of the at least one application; and a second generation component for generating in advance a second external constraint with respect to an association relationship between input data of at least two input fields of the at least one application.

BRIEF DESCRIPTION OF THE SEVERAL VIEWS OF THE DRAWINGS

Features, advantages, and other aspects of the present subject matter will become apparent from the detailed description, when taken in conjunction with the figures wherein:

FIG. 1 schematically illustrates a schematic view of an example of an implementation of an application environment in which a method according to an embodiment of the present subject matter may be implemented;

FIG. 2A schematically illustrates a first example of an implementation of input fields in an example application;

FIG. 2B schematically illustrates a second example of an implementation of input fields in an example application;

FIG. 2C schematically illustrate a third example of an implementation of input fields in an example application;

FIG. 2D schematically illustrate a fourth example of an implementation of input fields in an example application;

FIG. 4A schematically illustrates a schematic view of an example of an implementation of providing a prompt to a user regarding input data candidates according to an embodiment of the present subject matter;

FIG. 4B schematically illustrates a schematic view of an example of an implementation of automatically filling input data in a current input field according to an embodiment of the present subject matter;

FIG. 4C schematically illustrates a schematic view of an example of an implementation of verifying the validity of an input value for the current user according to an embodiment of the present subject matter;

FIG. 4D schematically illustrates a schematic view of an example of an implementation of processing/outputting content of respective input fields between different applications according to an embodiment of the present subject matter;

FIG. 7A schematically illustrates a first detailed flowchart of an example of an implementation of an embodiment of the step for input processing and identification/creation of context-aware input data; and FIG. 7B schematically illustrates a second detailed flowchart of an example of an implementation of an embodiment of the step for providing an output operation for context-aware input data.

DETAILED DESCRIPTION

Figure 3:
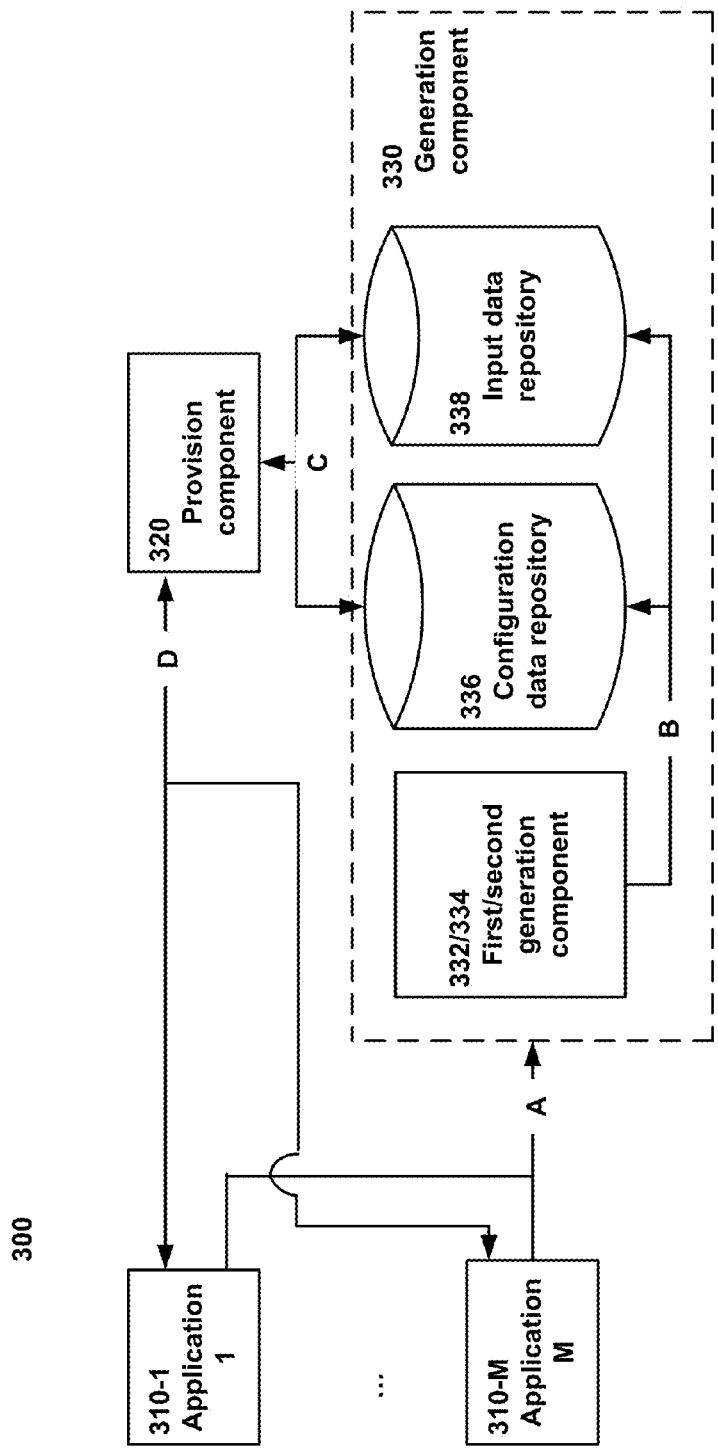
FIG. 3 schematically illustrates an operation procedure of an example of an implementation of a device according to an embodiment of the present subject matter.

According to the embodiments of the present subject matter, there is provided a method and apparatus for providing context-aware input data to an application running on a computer system. Detailed description is presented below for each embodiment of the present subject matter with reference to the figures.

There are usually many restrictions on input values for input fields of various applications. For example, the input value for an input field of telephone numbers for a certain area in Beijing is restricted to an eight-digit integer starting with "+86-10." For different input fields of a same application or different applications, their input values may possibly have an association relationship between them. For example, information such as "product number" and "manufacturer" needs to be input into an order system, subsequent to which the same information needs to be input into another financial system. This requires a manual copy/paste operation. Another circumstance is also possible in which an application includes two input fields "product unit price" and "amount," and another application may include only one field "product total price"; such that the input values satisfy the expression "product total price"="product unit price" multiplied by (e.g., ×) the "amount." At this point, manual calculation and input may also be needed.

Daily inputting repeated data into various applications is a dull and time-consuming task. Any inputting error may lead to an invalid order, or other errors may cause a huge loss. Furthermore, people have to spend considerable time on the inefficient manual copy/paste procedure, which is not only inefficient but also error-prone.

Although there already exist a plurality of inputting methods having a memorizing function, these inputting methods merely provide prompts regarding input content candidates for a user's input by memorizing a vocabulary frequently used by the user recently or by manually configuring short cut keys to several commonly used words. However, such prompts merely provide the user with very limited input assistance.

For a specific user who needs to enter inputs into input fields of various applications every day, when the user repeatedly inputs information into applications for a long time, for purposes of the present subject matter it may be assumed that the user's inputting behavior is predictable (i.e., data input by the user has similarity during a specific period of time). It may also be assumed that data to be input into the application by the user has similarity, or inputs may be selected from an "input data pool," instead of entirely relying on manual inputting or "Ctrl+C/Ctrl+V" copy/paste operation of an operating system.

A method according to some embodiments of the present subject matter comprises: generating in advance external constraints for at least one input field of at least one application; based on the external constraints, providing context-aware input data to at least one input field of a currently used application. The external constraints mentioned herein refer to external constraints generated in advance on input data for a single input field and external constraints generated in advance based upon the association relationship between input data for two or more input fields. The external constraints generated in advance may be stored in an application locally or in a database of a dedicated or general-purpose server for sharing by other users.

FIG. 1 schematically illustrates a schematic view 100 of an example of an implementation of an application environment in which a method according to an embodiment of the present subject matter may be implemented. As illustrated in FIG. 1, the user may utilize the method according to the present subject matter at different types of user terminals, such as a desktop computer 110-1, a laptop computer 110-2, a panel computer 110-3, a personal digital assistant (PDA) 110-4, and a mobile terminal 110-N.

It should be noted that according to embodiments of the present subject matter, external constraints as generated in advance may be locally stored in a user terminal running various applications, and further, they may be stored in a dedicated server 120, so that users may access the external constraints from respective user terminals 110-1 to 110-N via a network 130. Further, it should be noted that according to the embodiments of the present subject matter, the external constraints may be located in at least one dedicated or general-purpose server that is external to the respective user terminal, in a concentrated or distributed manner.

Figures 2, 2A, 2B, 2C, 2D:
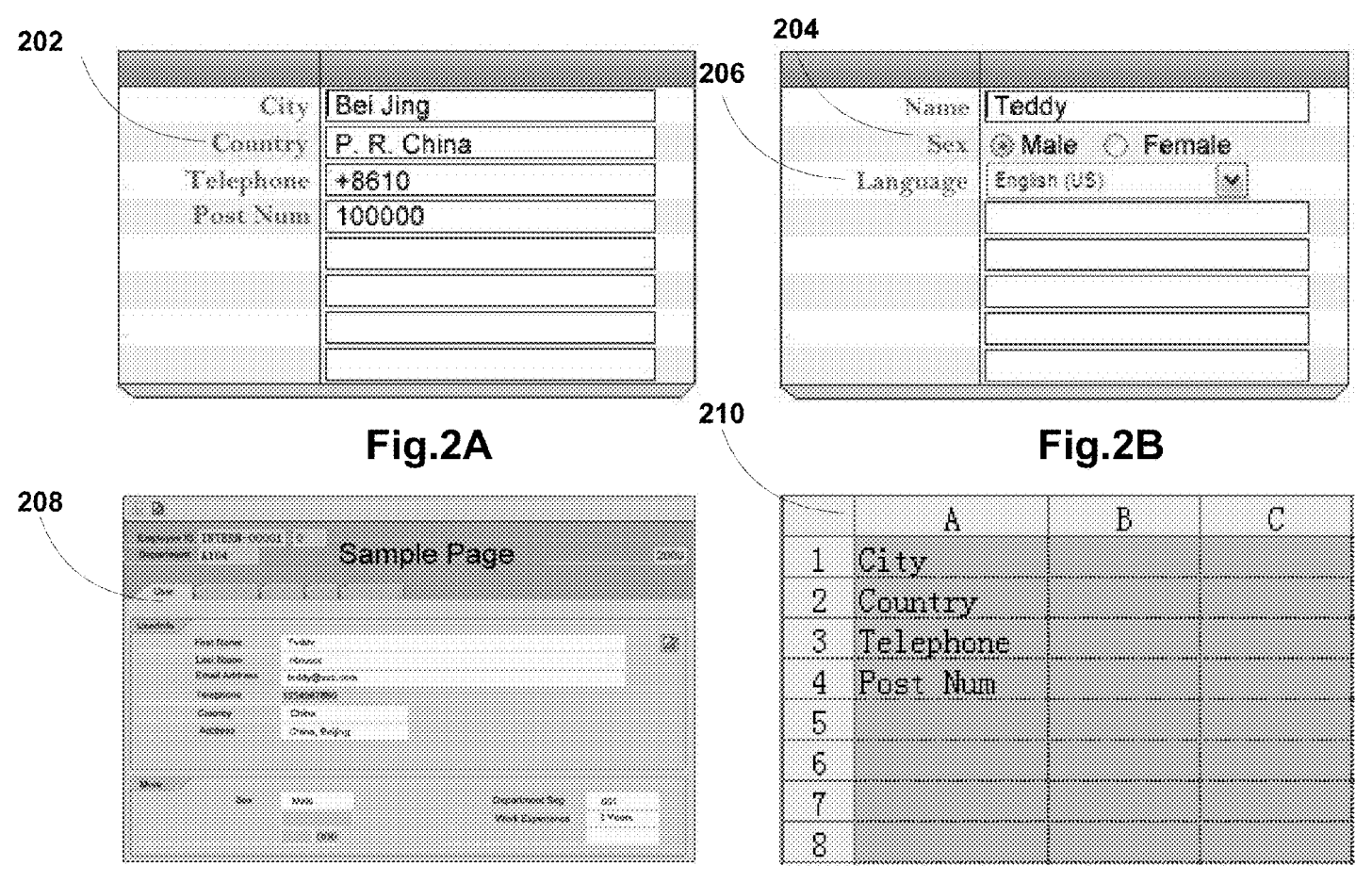

Hereinafter, with reference to FIG. 2, detailed description is presented for the operation of providing input data according to the embodiments of the present subject matter. FIGS. 2A-2D schematically illustrate example implementations of various input fields in an example application. According to an embodiment of the present subject matter, the input field may be a text input box 202 in an application as illustrated in FIG. 2A, wherein the input field is not limited to the text input box 202 for inputting data but may include, without limitation, a radio button (as illustrated by 204 in FIG. 2B), a check box, a drop-down menu (as illustrated by 206 in FIG. 2B), a selection menu, a text input field, various data fields for inputting data, respective pages in an application (as illustrated by a tab 208 in FIG. 2C), and an individual electronic data sheet 210 (e.g., an Excel® spreadsheet) as illustrated in FIG. 2D, or any other sheet in electronic tabulation tools.

It should be noted that the method according to the present subject matter may apply to applications of different language interfaces. For example, the input field "国家" in Chinese and the input field "country" in English actually represent the same meaning in different applications, so external constraints between them may be pre-defined. That is, the method according to the present subject matter is not limited to languages used in respective applications or the type of a language input by the user. Rather, the method according to the present subject matter is applicable to any languages, so long as the user has pre-defined external constraints on one or more input fields of one or more applications.

FIG. 3 schematically illustrates an operation procedure 300 of an example of an implementation of a device according to an embodiment of the present subject matter. Blocks 310-1 to 310-M illustrate multiple applications. The device according to the present subject matter may provide data with respect to input fields of the multiple applications. As illustrated in the right side of FIG. 3, the device according to the present subject matter may include two portions, namely a provision component 320 and a generation component 330. The generation component 330 includes a first generation component 332 for generating a first external constraint and a second generation component 334 for generating a second external constraint. A configuration data repository 336 and an input data repository 338 may be located within the generation component 330 or in a remote server.

According to an embodiment of the present subject matter, the first generation component 332 and the second generation component 334 obtain inputs with respect to applications 310-1 to 310-M (as illustrated by arrow A) in the procedure of generating external constraints in advance. There are many options for obtaining inputs: 1) user inputs may be obtained by monitoring keyboard events, (e.g., every time the user presses a keyboard key, information on the pressed key may be obtained simultaneously or instantly) and information on respective pressed keys may be combined to form an input with respect to a current input field; 2) after the user has entered all content of the current input field, overall input information may be obtained from the current input field. An advantage in adopting the second option is that information obtained every time the user presses a key does not need to be saved or processed, and all input data may be collected at a time after the user completes the input. In this manner, it may be possible to obtain information that the user wants to input into the input field ultimately, without inputting scattered characters. This may be conspicuous in a situation that the user utilizes a Chinese input method, for example. When the user wants to input "中国," the input value "中国" may be obtained by simply inputting "zhongg" and pressing the Spacebar in some input methods that support Pinyin (a Chinese language transcription system) for initial letters, at which point the keyboard event being monitored may be an event of consecutive letters "zhongg" and pressing the Spacebar.

According to the embodiments of the present subject matter, generating external constraints in advance further includes determining the identification of the application, and determining the identification of the input field. For example, an application ID and an input field ID may be obtained as the identifications by using Windows® application programming interface (API) or other means. In the subsequent processing procedure, the application ID and the input field ID may be jointly used as an identifier for differentiating the input field. According to the embodiments of the present subject matter, the identification of a page in the application may further be obtained.

The first generation component 332, as illustrated in FIG. 3, may be used for generating in advance a first external constraint with respect to input data to a single input field. The first external constraint refers to the restrictions on content of the input field in the application. For example, the input value for the input field "product model" may be restricted to a specific model existing in a product list; the input value for the input field "zip code" may be restricted to a multi-digit integer of a numeric type; the input value for the input field "country" may be restricted to the name of a specific country.

The second generation component 334 may be used for generating in advance a second external constraint with respect to the association between input data of two or more input fields. The second external constraint refers to the restrictions on the relationship between different input fields (in a same or different applications). For example, the same application may include input fields such as "City," "Country," "Area Code," and "Zip Code." It is to be understood that these input fields may have an association. Once the input value for the field "City" is determined, content of the input fields "Country," "Area Code," and "Zip Code" may be determined. A second external constraint between these input fields may be defined. For another example, an application in a Chinese interface may have input fields such as "城市," "国家," "电话区 号," and "邮政编码" in Chinese and another application may have the input fields "City," "Country," "Area Code," and "Zip Code" in English, so a second external constraint may be defined with respect to corresponding fields of these two applications. For example, the second external constraint may be defined in the form of Table 1 below. It is to be understood that Table 1 is illustrative and the external constraints may be defined in any feasible form according to embodiments of the present subject matter.

TABLE 1

| Second External Constraint | |
|---|---|
| 城市 | City |
| 国家 | Country |
| 电话区号 | Area Code |
| 邮政编码 | Zip Code |

It should be noted that for a specific input field, there may exist no or more first/second external constraints. For example, the input field "邮政编码" (zip) may have the following constraints: a first external constraint defining input data as a multi-digit integer, a second external constraint associating "邮政编码" (zip) with "城市" (city), "国家" (country), and "电话区" (telephone number), and a third external constraint associating "邮政编码" (zip) with the input field "Zip Code" in another application.

According to the embodiments of the present subject matter, the configuration data repository 336 may be used for storing external constraints that have been generated in advance, and the input data repository 338 may be used for storing user-input historical records or a pre-defined data repository, such as a list of legitimate vendors (e.g., data input by the user with respect to the input field in the application). The generation procedure may be as illustrated by arrow B in FIG. 3, in which the first generation component 332 and the second generation component 334 save the generated external constraints and the obtained historical input data to the configuration data repository 336 and the input data repository 338, respectively.

It should be noted that the external constraints mentioned here are generated in advance. As such, an initialization procedure does not have to be performed every time input data is provided using the method according to the present subject matter. The external constraints generated in advance may be saved in a remote server for sharing by multiple users. Different external constraints may be generated with respect to different user classes of users. Further, the user may save private external constraints, which are customized according to his/her personal information, locally at the client terminal, while accessing common external constraints from the remote server.

According to the embodiments of the present subject matter, after the external constraints are generated, the configuration of the external constraints may be modified dynamically with respect to a current application during usage, such as adding a new external constraint, deleting an obsolete external constraint, or updating an existing external constraint. In addition, the external constraints do not remain unchanged; rather, they may be adjusted continuously throughout the procedure of using the method according to the present subject matter. That is, the procedure of generating external constraints may be a cyclic update procedure that undergoes times of modification.

Hereinafter, referring to FIG. 3, description is presented for the procedure of providing context-aware input data to at least one input field of a current application based on external constraints. As illustrated in FIG. 3, the provision component 320 is coupled to the applications 310-1 to 310-M for obtaining application IDs, input field IDs, and current user input values from the applications. After querying the configuration database 336 and the input database 338 as illustrated by arrow C, the provision component 320 provides context-aware input data to corresponding input fields of the applications 310-1 to 310-M in the direction as illustrated by arrow D.

Hereinafter, referring to FIGS. 4A-4D, detailed description is presented for an example of an implementation of an operation interface 400 regarding how to provide context-aware input data to an input field of an application according to different embodiments of the present subject matter. The operational interface 400 may include one or more user interfaces, as shown within the examples of FIGS. 4A-4D, for receiving and outputting data. Providing context-aware input data includes determining the identification of the application and the identification of a current input field, and detecting/obtaining a current input value, such as via the user interface; and based on the above data, implementing as input data the context-aware data associated with the current input value as defined in the external constraints. In the procedure of providing input data, the identification of the application, the identification of the input field, and the current input value as detected/obtained may be used as keywords for retrieving corresponding external constraints.

Additionally, in the case that the application includes multiple pages (e.g., including multiple tabs as illustrated in FIG. 2C), the page identification of the application should be identified, and input data may be provided based on the identification of the application, the page identification, the identification of the input field, and the current input value. For different applications, it may be useful to determine other identifiers other than the identification of the application and the identification of the input field, aiming at uniquely locating the current input field.

FIG. 4A schematically illustrates a schematic view of providing a prompt to a user regarding input data candidates according to an embodiment of the present subject matter. A prompt with respect to a specific input field may be preconfigured among the external constraints, for example, by expressing a character string or a character string that may be difficult to remember by using a phrase that is easy to remember, or expressing a relatively long input by using abbreviation characters.

In an order system, for example, the input value for the field "Vendor ID" may be restricted to the number of a specific vendor, whereas these numbers may be difficult to remember. As such, it may be predefined in the external constraints that character strings "CompanyA" and "CompanyB" represent the vendor numbers "9878987" and "1273645," respectively. As illustrated in FIG. 4A, when it is detected that "Company" is input to the input field "Vendor ID," vendor numbers corresponding to the user input may be provided as candidates in a prompt box 402 for selection by the user.

In an embodiment of the present subject matter, the user may utilize the prompted input data to modify or fill in the current input field, for example, by using numeric keys or up and down keys for selection.

In an embodiment of the present subject matter, the prompted/modified input data may be utilized to modify or automatically fill in the current input field with the prompted/modified input data and at least one other input field that has an external constraint relationship with the current input field with context-aware input data. Specifically, FIG. 4B schematically illustrates a schematic view of automatically filling input data in the current input field according to an embodiment of the present subject matter. As described above, external constraints have been established in advance with respect to the fields "City," "Country," "Telephone," and "Zip Code" in the application. That is, these input fields have association relationships. When the user inputs an input value to any of the fields, inputs to other fields may be located from the external constraints, and other input fields are filled in automatically.

For example, the user inputs "Beijing" to the field "City" as illustrated in FIG. 4B. As known from the external constraints, "Beijing" is a Chinese city, its telephone area code is "+86-010," and its Zip Code is "100000." Hence, these input values may be automatically input to corresponding input fields (an interface after the automatic inputting is as illustrated in FIG. 4B). It should be noted that after the user enters an input to any input field, input values for other input fields that are associated with this input field may be "associated," regardless of the order of input fields in the interface. For example, when the user inputs "100000" to "Zip Code," it is known, again according to the external constraints, that "100000" is the zip code of "Beijing," "Beijing" is a Chinese city and its telephone area code is "+86-010." So these values are automatically filled in corresponding input fields.

According to the embodiments of the present subject matter, it is possible to modify the filled input value or provide a prompt regarding possible errors in the current input data, through "association."

According to an embodiment of the present subject matter, the validity of the current user input value may be verified. For some input fields whose content is strictly restricted, it may be prudent to ensure the correctness of an input value, as such the present subject matter provides a tool for verifying whether an input is valid. Verifying the validity of an input may be divided into mandatory verification and suggestive verification or other verification manner. Mandatory verification may be used for input fields having relatively tight constraints, such as product number, vendor number, and so on. When a user input value is invalid, a prompt may be provided to the user, informing that the input value is invalid (as illustrated by the prompt box 404 in FIG. 4C), and the prompt may be maintained until the user inputs a valid value. Suggestive verification may be used for input fields having relatively loose constraints. When it is detected that there may be an invalid user input, an alert may be provided to the user, prompting the user to check whether the current input value is correct.

According to an embodiment of the present subject matter, it is possible to process the input value for at least one input field in a first application, process/output information associated with the input value to at least one corresponding input field in a second application. FIG. 4D schematically illustrates a schematic view of processing/outputting content of respective input fields between different applications according to an embodiment of the present subject matter.

Application user interfaces 410 and 420 illustrate respective interfaces of the first application and the second application. External constraints have been predefined with respect to input fields in these two applications with input fields with the same name in the two applications that have the same input data. Hence, all input values having external constraints and filled in the first application by the user may be completely processed/output into corresponding input fields in the second application. However, it is to be understood that names of input fields of multiple applications do not necessarily need to be identical to each other (which may be, e.g., "telephone" and "telephone number," respectively) so long as external constraints have been predefined.

An application user interface 430 illustrates an interface resulting from processing/outputting input data from the first application user interface 410 into the application user interface 420. The user may process/output input data between input fields that have external constraints, by a shortcut key, a functional button, or other manners. For example, FIG. 4D illustrates input values for input fields "telephone" 412, 422, prior to the processing/outputting, and input field 432 subsequent to the processing/outputting.

The "process/output" operation in the foregoing example may be construed as a "super copy/paste" operation to some extent, that accomplishes more functions than conventional "copy/paste" operations. The "process/output" operation according to the foregoing embodiment of the present subject matter is not limited to, for example, the "Ctrl+C/Ctrl+V" function in the Windows® operating system, but may comprise complex operations implemented according to the predefined external constraints. According to the embodiments of the present subject matter, it is possible to process input data in an application and process/output the processed data to associated input fields. Other examples of the "process/output" operation are presented below:

Example 1

A first application includes the input fields "unit price" and "amount," and a second application only includes the input field "total price." At this point, external constraints may be established between input fields of these applications, such that an input value meets the following Equation (1):

$$\text{total price} = \text{unit price} \times \text{amount} \quad \text{Equation (1):}$$

If the user inputs "100" to "unit price" and "10" to "amount" in the first application, when the user requests the "process/output" operation, "1000" may be filled in the input field "total price" in the second application.

Example 2

A first application includes two input fields, namely "area code" and "telephone number," and a second application only includes the input field "telephone." At this point, external constraints may be established between input fields of these two applications, such that input data of the field "telephone" in the second application is a character string connection of input data of the two fields "area code" and "telephone number" in the first application and uses a dash "-" as a separator.

If the user inputs "+86-010" to "area code" and "12345678" to the field "telephone number" in the first application, when the user requests the "process/output" operation, input data "+86-010-12345678" may be filled in the input field "telephone" in the second application.

Example 3

A first application may utilize English interface display and includes the input field "City," and a second application may utilize Chinese interface display and includes the input field "城市." External constraints may be established between input fields of the two applications, such that when the user inputs an English city name to the field "City," the Chinese name of the input city is automatically filled in the field "城市" in the second application.

For example, when the user inputs "Beijing" to the field "City," "北京" (Beijing) is automatically filled in the field "城市" (City).

It should be noted that the above examples illustrate non-limiting examples of the "process/output" operation that may be implemented according to the present subject matter. It is possible to use an input field of a first application as an input for certain operations and output results to corresponding input fields in a second application based on other external constraints. The operations include, without limitation, a mathematical operation, a logical operation, a character operation, and other types of feasible operations. According to the embodiments of the present subject matter, external constraints may be established between input fields of multiple applications, so that an input value for an input field in at least one application may be used as an input and context-aware input data may be provided to an input field of at least one other application.

Figure 5:
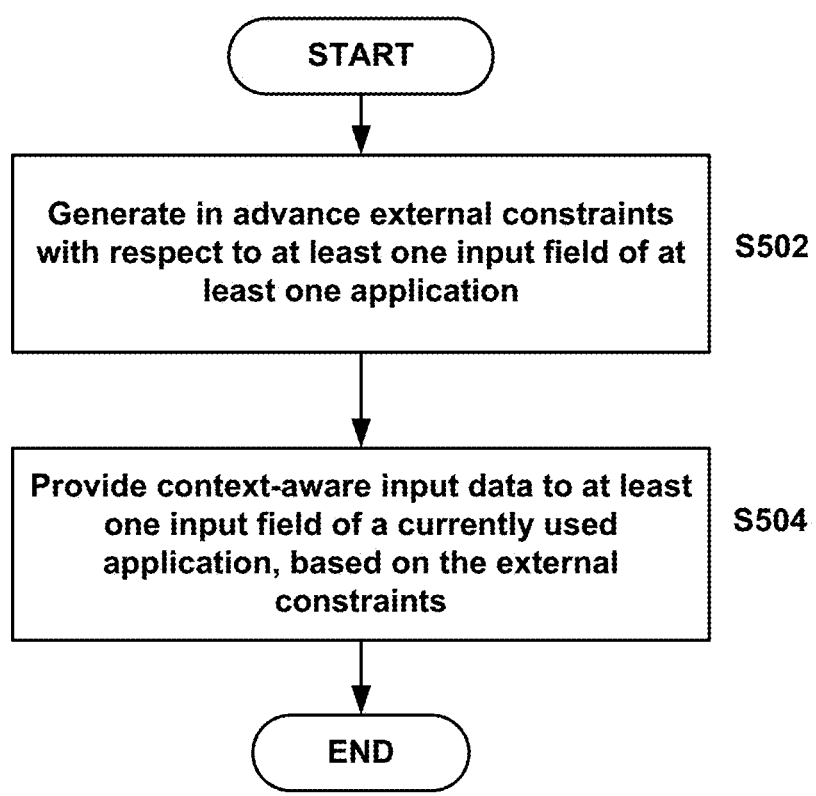
FIG. 5 schematically illustrates a flowchart of an example of an implementation of a method for providing context-aware input data according to an embodiment of the present subject matter.

FIG. 5 schematically illustrates a flowchart 500 of an example of an implementation of a method for providing context-aware input data. As illustrated in FIG. 5, external constraints are generated in advance with respect to at least one input field of at least one application in step S502. It should be noted that the step of generating external constraints may be a preprocessing step which may be performed by an administrator or other person, independent of the current user. The generated external constraints may be stored in a storage location that is accessible to user devices.

In step S504, context-aware input data is provided to at least one input field in a currently used application based on the external constraints. According to the embodiments of the present subject matter, context-aware input data may be provided in various manners, including providing input data candidates, modifying or automatically filling in a current input field, verifying validity of a current input value, and the "process/output" processing that have been described above with reference to FIGS. 4A-4D.

Figure 6:
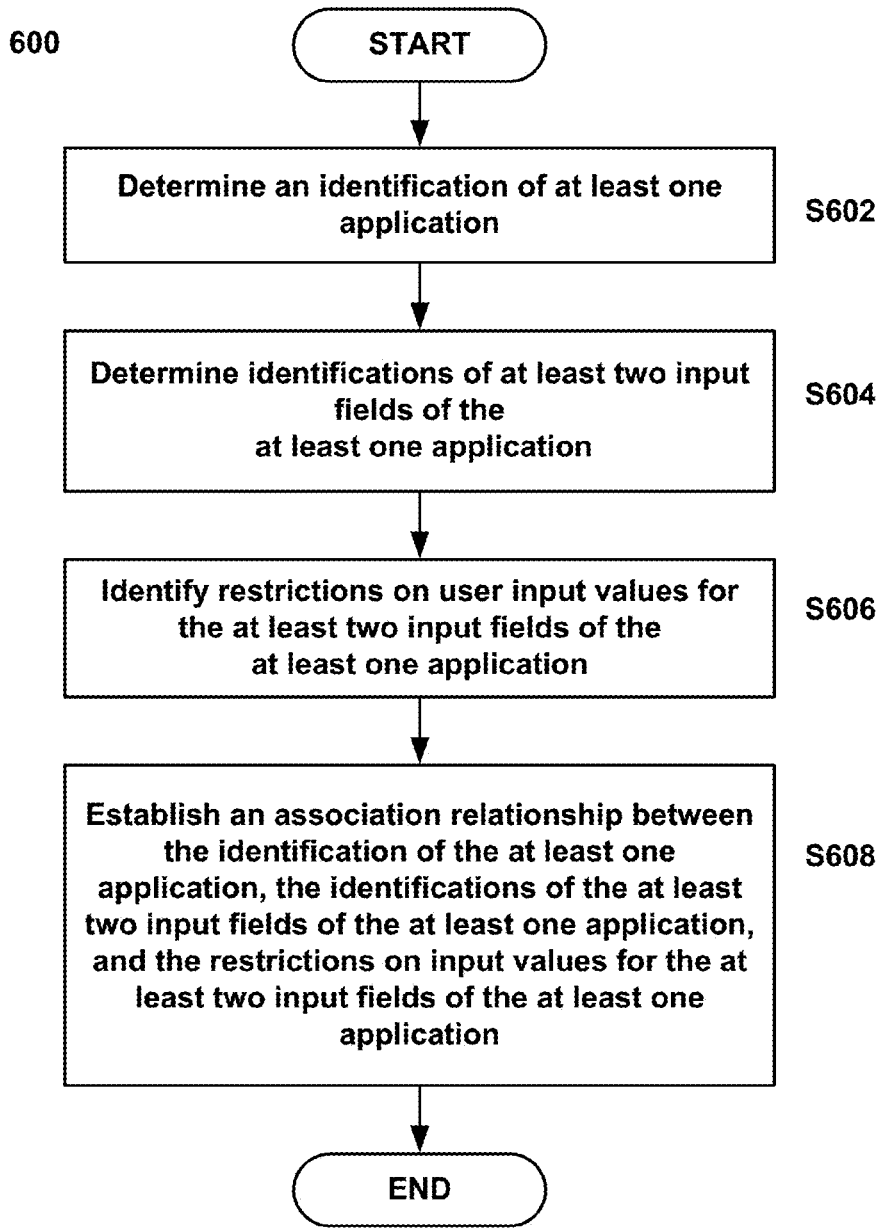
FIG. 6 schematically illustrates a detailed flowchart of an example of an implementation of an embodiment of a step for generating external constraints as illustrated in FIG. 5.

FIG. 6 schematically illustrates a detailed flowchart 600 of an example of an implementation of an embodiment of step S502 for generating external constraints as illustrated in FIG. 5. The external constraints may be a first external constraint with respect to an input field per se and a second external constraint with respect to the association between input fields, respectively. The first external constraint relates to the restrictions on field content per se, and various implementations of the first external constraint may be achieved based upon the present subject matter. Hence, the procedure of generating external constraints in advance is explained below in the context of establishing the second external constraint.

In step S602, the identification of at least one application is determined. In step S604, identifications of at least two input fields of the at least one application are determined. In step S606, restrictions on input values for the at least two input fields of the at least one application are identified. In step S608, an association relationship is established between the identification of the at least one application, identifications of the at least two input fields of the at least one application, and the restrictions on input values for the at least two input fields of the at least one application. It should be noted that an additional operation of obtaining a page identification may be used in an embodiment of the present subject matter.

Hereinafter, detailed description is presented for the operation procedure of providing input data according to the embodiments of the present subject matter in the context of complex "process/output" processing.

Reference is made back to FIG. 4D when explaining the "process/output" operation. As illustrated in FIG. 4D, for example, the input field "Telephone" 412 of the first application interface 410 and the input field "Telephone" 422 of the second application interface 420 are identified, and external constraints of "process/output" are established between the two input fields, which is as illustrated in the following tables.

TABLE 2

Content of Application 1
Content of Application

| Application ID | APP-001 |
|---|---|
| Page ID | Page-001 |
| Field name | Telephone |

TABLE 3

Content of Application 2
Content of Application

| Application ID | APP-002 |
|---|---|
| Page ID | Page-002 |
| Field name | Telephone |

TABLE 4

Process/Output Rule
Process/Output Rule

| Rule ID | Rule-001 |
|---|---|
| Source application ID | APP-001 |
| Source page ID | Page-001 |
| Source field | Telephone |
| Target application ID | APP-002 |
| Target page ID | Page-002 |
| Target field | Telephone |

The above Table 2 through Table 4 illustrate external constraints for processing/outputting the input field 412 of the first application interface 410 to the input field 422 of the second application interface 420. In addition, external constraints may be defined likewise for other input fields in the first and the second applications, so that all input fields in the first application may be "processed/output" to corresponding fields in the second application by using the external constraints.

Hereinafter, referring to FIGS. 7A and 7B, description is presented for the flow of the "process/output" operation in an embodiment. After "process/output" external constraints are defined, input content may be processed/output from the first application to the second application. FIG. 7A schematically illustrates a detailed flowchart 700 of an example of an implementation of an embodiment of the "process" (understood as "super copy" to some extent) operation for input processing and identification/creation of context-aware input data. The flow starts with a hot key processing illustrated in step S702*a*, for initiating the "process/output" processing according to the present subject matter. It should be noted that the hot key processing mentioned here may be the processing of a shortcut key as defined according to the embodiments of the present subject matter (for example, it may be defined as "Ctrl+Shift+C" or other shortcut key so as to be distinguished from the shortcut key "Ctrl+C" of the operating system) or the processing of another button or menu for activating the "process" function.

Next, an application identification and a page identification are obtained in step S704*a*, which are respectively App-001 and Page-001 in this example. In step S706*a*, it is determined whether or not there are external constraints for the process/output of a current page. If not, the operation flow ends; if yes, the flow proceeds to step S708*a* in which the process/output data associated with the current page is loaded based on the external constraints.

When the flowchart illustrated in FIG. 7A ends, the user has loaded input data for various input fields for outputting to other applications. FIG. 7B schematically illustrates a detailed flowchart 701 of an example of an implementation of an embodiment of the "output" operation for context-aware input data. Like the output of the hot key in step S702*a*, the hot key output function is initiated in step S702*b*. Subsequently in step S704*b*, an application identification and a page identification are obtained, which are the application ID App-002 of the second application (currently in an active state) and the page identification Page-002. It is then determined in step S706*b* whether or not there are external constraints for the process/output of a target page. If not, the flow then ends; if yes, the flow proceeds to step S708*b*.

As described above, because external constraints are already present in the current process/output processing (as illustrated in Table 4), data is obtained from data sources (i.e., the source application App-001, the source page Page-001, the source field Telephone) as indicated by the external constraints in step S708*b*. In step S710*b*, the obtained data is provided to corresponding input fields of a target application, namely, the target application App-002, the target page Page-002, and the target field Telephone. At this point, the input value for the field Telephone in the second application is the same as that for the field Telephone in the first application, which is "1234567890" (see FIG. 4D).

For the process/output operation of other input fields in the application, the operation flow is similar to that as described above, and as such, details thereof are omitted.

According to an embodiment of the present subject matter, it is possible to optimize the procedure of processing/outputting multiple input fields in the application, e.g., by dividing input fields to be processed/output into groups and defining the process/output operations for the groups.

It should be noted that the process/output operation according to the embodiments of the present subject matter is more sophisticated than conventional copy, due to a mapping relationship between respective input fields of an application or between input fields of another application on the basis of predefined external constraints. Although examples are presented for processing/outputting input data in one-to-one correspondence between input fields of two applications, it should be understood that the process/output processing according to the present subject matter may include, without limitation, a mathematical operation, a logical operation, a character operation, and other types of feasible operation.

It should be understood that the "hot key process" and "hot key output" operations in FIGS. 7A and 7B are two sequential operations having a cause-and-effect relationship. Once the user triggers the hot key process function in the first application, input data of an input field in the first application, for which external constraints are defined, is loaded. When the user switches to the second application, the loaded input data may be provided to a corresponding input field of the second application by triggering the hot key.

It should be understood that according to an embodiment of the present subject matter, data may be processed/output between the first application and the second application by setting a "bidirectional" mark, such that the process/output is implemented in a two-way manner.

The foregoing "process/output" operation as illustrated in FIGS. 7A and 7B may be understood as "super copy" and "super paste." According to the embodiments of the present subject matter, the "super copy" and "super paste" operations may be implemented with respect to input values for multiple input fields of at least one application. Those skilled in the art may perform the operations with reference to the steps illustrated in FIGS. 7A and 7B based upon the description herein.

For example, the page of the first application includes the input fields "unit price" and "amount," and the user inputs "100" to "unit price" and "10" to "amount" in the first application. In addition, the user desires input data "1000" to be automatically filled in the input field "total price" in the second application. Like step S706a in FIG. 7A, it is determined whether or not there are external constraints for "process/output" of the current page, and in this example the external constraint is "total price=unit price×amount." Like step S708a in FIG. 7A, mapping data (i.e., 100×10=1000) associated with "process/output" of the current page is loaded. Like the step S710b illustrated in FIG. 7B, the input data "1000" is filled in the input field "total price" in the page of the second application.

According to the embodiments of the present subject matter, it is possible to utilize a standalone tool to provide a method for providing context-aware input data to an application running on a computer system, and the standalone tool may be used in a user's client terminal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood from the foregoing description that modifications and alterations may be made to the respective embodiments of the present subject matter without departing from the true spirit of the present invention. The description in the present specification is intended to be illustrative and not limiting. The scope of the present subject matter is limited by the appended claims only.

What is claimed is:

1. A method, comprising:
    generating in advance, within a memory, external inter-application input field constraints that specify a configured association relationship between an input field utilized during execution by one a first application and multiple input fields utilized during execution by a second application; and
    providing, during concurrent execution of the first application and the second application, and in response to user input entered into the input field of the executing first application and based on the external inter-application input field constraints, context-aware input data to the multiple input fields of the concurrently-executing second application;
    where user interface input field name spellings of the first application and the second application are in different languages and the context-aware input data is provided to the multiple input fields of the second application in a different language used by the second application relative to a language used by the first application.

2. The method according to claim 1, where the generating in advance the external inter-application input field constraints comprises at least one of:
    generating in advance a first external inter-application input field constraint with respect to input data of the input field utilized during execution by the first application; and
    generating in advance a second external inter-application input field constraint with respect to an association relationship between input data of the multiple input fields utilized during execution by the second application.

3. The method according to claim 2, where the generating in advance the first external inter-application input field constraint comprises:
    determining an application identification of the first application;
    determining an input field identification of the input field utilized during execution by the first application; and
    providing a predefined first external inter-application input field constraint with respect to the input field utilized during execution by the first application.

4. The method according to claim 2, where the generating in advance the second external inter-application input field constraint comprises:
    determining an application identification of the second application;
    determining input field identifications of the multiple input fields utilized during execution by the second application;
    identifying at least one restriction on input values provided by a user for the multiple input fields utilized during execution by the second application that specify available input options and interrelationships between the available input options of the multiple input fields utilized during execution by the second application; and
    establishing an association relationship between the application identification of the second application, the input field identifications of the multiple input fields of the second application, and the at least one restriction on input values for the multiple input fields of the second application.

5. The method according to claim 1, where the providing the context-aware input data to the multiple input fields of the concurrently-executing second application comprises:

determining an application identification of the executing first application;

determining an input field identification of the input field of the executing first application;

obtaining an input value for the input field of the executing first application; and providing to a user the context-aware input data, as input data to the concurrently-executing second application during the concurrent execution via a user interface, associated with the input value for the input field of the executing first application and defined in the external inter-application input field constraints, based on the application identification of the executing first application, the input field identification of the input field of the executing first application, and the input value for the input field of the executing first application.

6. The method according to claim 5, where the providing to the user the context-aware input data, as the input data to the concurrently-executing second application during the concurrent execution via the user interface, comprises:

prompting the user with input data candidates with respect to the input field of the executing first application to provide the context-aware input data to the multiple input fields of the concurrently-executing second application.

7. The method according to claim 5, where the providing to the user the context-aware input data, as the input data to the concurrently-executing second application during the concurrent execution via the user interface, comprises:

modifying or automatically filling in the multiple input fields of the concurrently-executing second application by using the context-aware input data.

8. The method according to claim 7, where the modifying or automatically filling in the multiple input fields of the concurrently-executing second application by using the context-aware input data comprises:

modifying or automatically filling in the multiple input fields of the concurrently-executing second application with the input field of the executing first application, by using the context-aware input data in accordance with the external inter-application input field constraints.

9. The method according to claim 5, further comprising:

verifying validity of the input value for the input field of the executing first application; and providing the verified input value to the input field of the executing first application.

10. The method according to claim 5, where the executing first application comprises one executing application of a plurality of currently used executing applications and providing to the user the context-aware input data, as the input data to the concurrently-executing second application during the concurrent execution via the user interface, comprises:

processing an input value for an input field of one of the plurality of currently used executing applications; and outputting context-aware input data information associated with the input value to at least one corresponding input field of at least one other of the plurality of currently used executing applications.

\* \* \* \* \*